(12) United States Patent
Kuo et al.

(10) Patent No.: US 6,627,285 B2
(45) Date of Patent: Sep. 30, 2003

(54) NOTE PAD

(75) Inventors: Tsung-Tien Kuo, Kaohsiung Hsien (TW); Jen-Rong Liu, Kaohsiung Hsien (TW); Ho-Tsai Lin, Kaohsiung (TW); Bin-Tzer Lin, Taipei (JP); Hsieh-Chang Hsieh, Kaohsiung Hsien (TW)

(73) Assignee: Taiwan Hopax Chems Mfg. Co. Ltd., Feng-Shan (TW)

( * ) Notice: Subject to any disclaimer, the term of this patent is extended or adjusted under 35 U.S.C. 154(b) by 5 days.

(21) Appl. No.: 09/785,570

(22) Filed: Feb. 20, 2001

(65) Prior Publication Data

US 2001/0031331 A1 Oct. 18, 2001

Related U.S. Application Data

(63) Continuation-in-part of application No. 09/324,280, filed on Jun. 2, 1999, now abandoned.

(51) Int. Cl.$^7$ ................................................. B32B 9/00
(52) U.S. Cl. ..................... 428/40.1; 428/40.2; 428/41.5; 428/41.7; 428/192; 428/194; 462/8; 462/62; 462/900; 462/901; 583/227
(58) Field of Search ................. 428/40.1, 40.2, 428/41.5, 41.7, 192, 194; 462/8, 62, 900, 901; 503/227

(56) References Cited

U.S. PATENT DOCUMENTS

| | | | | |
|---|---|---|---|---|
| 4,480,003 A | * | 10/1984 | Edwards et al. | 428/329 |
| 5,281,504 A | * | 1/1994 | Kanbayashi et al. | 430/99 |
| 5,283,092 A | * | 2/1994 | Everaerts et al. | 428/40.1 |
| 5,807,624 A | * | 9/1998 | Anderson et al. | 428/195 |

\* cited by examiner

Primary Examiner—Nasser Ahmad
(74) Attorney, Agent, or Firm—Foley & Lardner

(57) ABSTRACT

A note pad includes a plurality of stacked self-stick transparent note sheets. Each of the note sheets includes a transparent plastic film coated with a transparent coating layer and a pressure-sensitive adhesive layer. The coating layer is prepared from a mixture of a binder and at least one pigment. The weight ratio of the binder to the pigment ranges from 1:1 to 1:10. Each of the note sheets has an opacity of less than 45%.

9 Claims, 2 Drawing Sheets

NOTE PAD

CROSS-REFERENCE TO RELATED APPLICATION

This application is a continuation-in-part (CIP) of U.S. patent application Ser. No. 09/324,280, filed by the applicant on Jun., 2, 1999, now abandoned, the entire disclosure of which is incorporated herein by reference.

BACKGROUND OF THE INVENTION

1. Field of the Invention

This invention relates to a note pad, more particularly to a note pad having a plurality of self-stick transparent note sheets.

2. Description of the Related Art

Note pad is a product including a plurality of stacked self-stick note sheets, and has become popular in recent years since the note sheets can be attached on a surface of a table, a wall, a book or a document as desired for informing purpose. Conventionally, the self-stick note sheet is made of paper, and is opaque, thereby limiting its use.

SUMMARY OF THE INVENTION

Therefore, it is an object of the present invention to provide a note pad that includes a plurality of self-stick transparent note sheets which can overcome the aforementioned drawback.

According to the present invention, a note pad comprises a plurality of self-stick transparent note sheets stacked one above the other. Each of the note sheets includes a transparent plastic film coated with a transparent coating layer and a pressure-sensitive adhesive layer. The coating layer is prepared from a mixture of a binder and at least one pigment. The weight ratio of the binder to the pigment ranges from 1:1 to 1:10. Each of the note sheets has an opacity of less than 55%.

BRIEF DESCRIPTION OF THE DRAWINGS

In drawings which illustrate the preferred embodiment of the invention.

DETAILED DESCRIPTION OF THE PREFERRED EMBODIMENT

Figure 1:
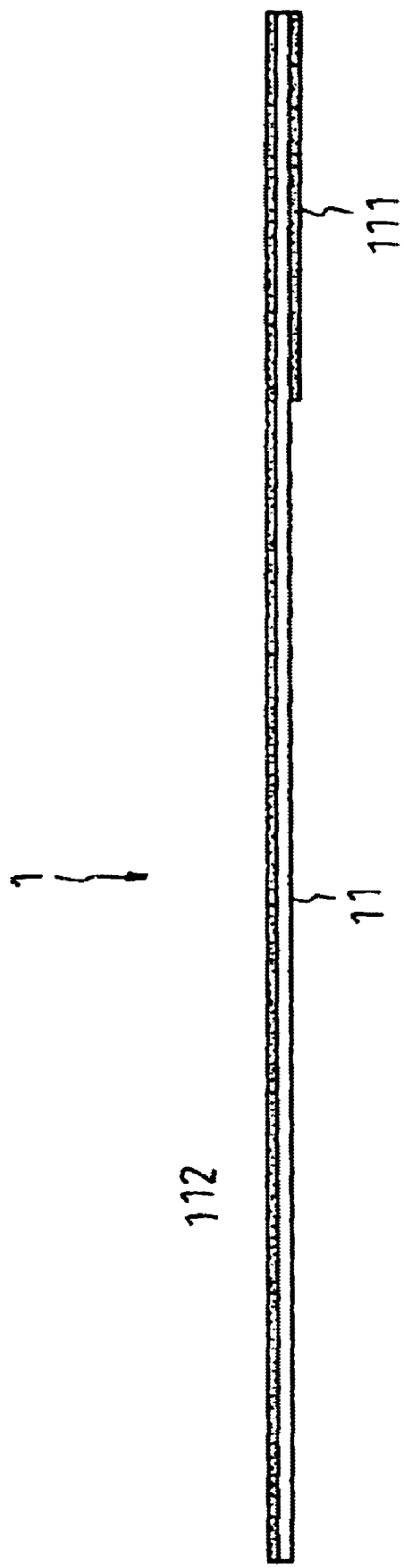
FIG. 1 illustrates a side view of a self-stick note sheet of a preferred embodiment of this invention.
Figure 2:
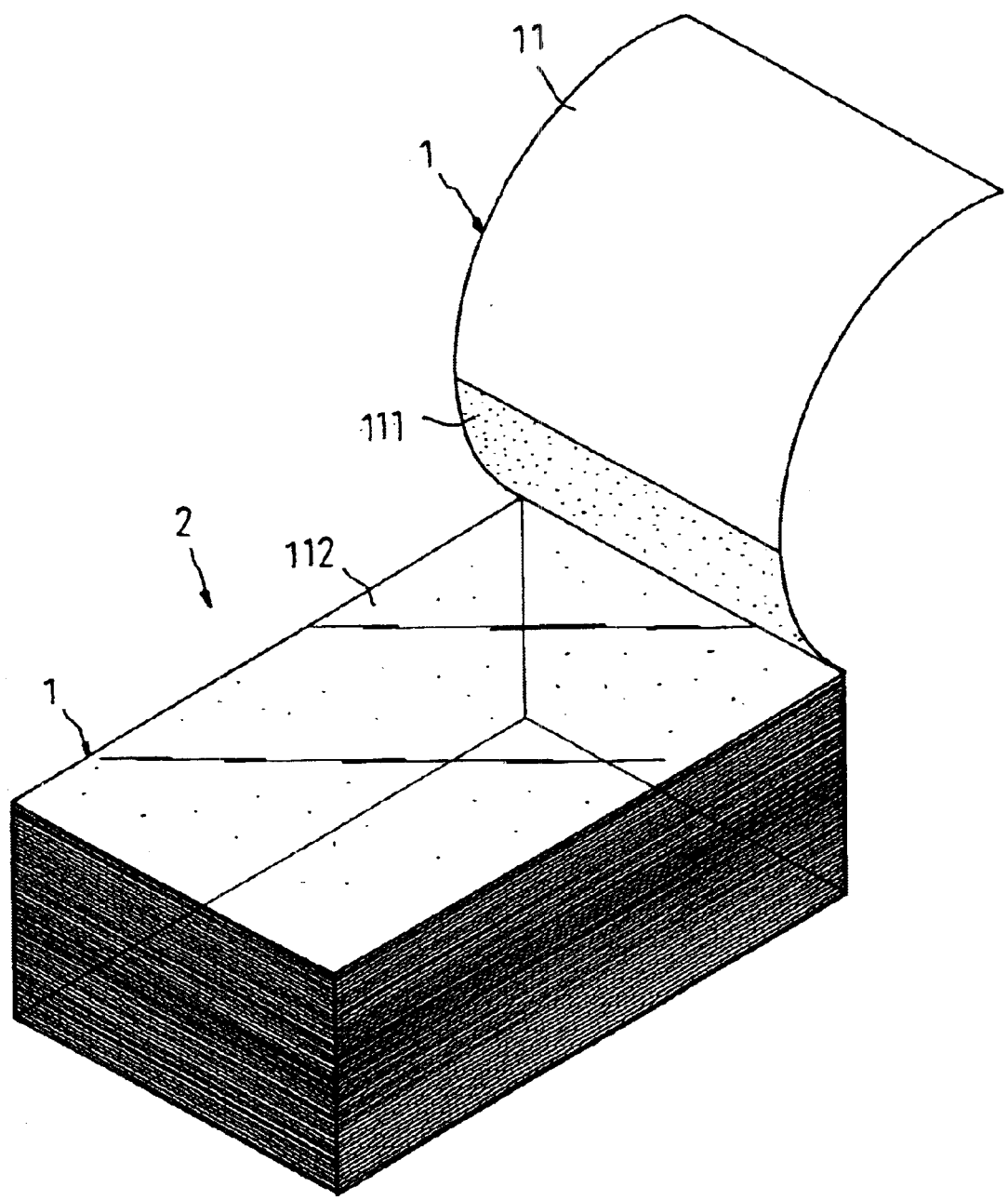
FIG. 2 illustrates a plurality of the self-stick note sheets of FIG. 1 arranged in a stack.

FIGS. 1 and 2 illustrate a side view of a note pad embodying this invention. The note pad includes a plurality of stacked note sheets 1, each of which includes a plastic film 11 coated with a pressure-sensitive adhesive layer 111 on the bottom side of the note sheet 1 and a transparent coating layer 112 on the top side of the note sheet 1. The coating layer 112 provides a writing face.

The plastic film 11 is made from a material selected from the group consisting of polypropylene, polyethylene, polyvinyl chloride, polyethylene terephthalate, and mylar. The pressure-sensitive adhesive layer 111 can be an acrylate-type adhesive.

The coating layer 112 of the note sheet 1 comprises a mixture of a binder and at least one pigment. The binder of the coating layer 112 is preferably selected from the group consisting of polyvinyl alcohol, polyacrylate, polyvinyl acrylate, and styrene butadiene rubber. The pigment of the coating layer 112 is preferably selected from the group consisting of titanium dioxide, calcium carbonate, clay, and mixtures thereof. The weight ratio of the binder to the pigment preferably ranges from 1:1 to 1:10 so as to render the coating layer 112 of the note sheet 1 to possess a transparent characteristic with excellent writing quality. It is noted that opacity of the note sheet 1 varies with the weight ratio of the binder to the pigment and the thickness of the coating layer 112 on the plastic film 11.

With the transparent characteristic, the note sheet 1 can be utilized in a document reproduction process that involves reproducing an assembly of a printed paper sheet and the note sheet 1 attached to the printed paper sheet via a copier or a fax machine to produce a copy sheet with images or characters that are reproduced from corresponding images or characters on a region of the printed paper sheet which is covered by the note sheet 1 during the reproduction process. Moreover, the images or characters on the region of the printed paper sheet, which are covered by the note sheet 1, can be directly viewed without removing or peeling off the note sheet 1. The note sheet 1 preferably has an opacity of less than 55%, more preferably less than 40%, and most preferably less than 30%, so that the images or characters which were reproduced on the aforesaid copy sheet can be clearly observed.

The coating layer 112 of the note sheet 1 can further include a dye so as to color the note sheet 1. The dye may be added in an amount of more than 2% by weight based on the total weight of the pigment.

The note sheet 1 of this invention can further include a release paper (not shown) for covering and protecting the coating layer 112 of the plastic film 11.

The following Examples illustrate variation of writing quality of the note sheet 1 with the weight ratio of the binder to the pigment for different combinations of binders and pigments.

EXAMPLES 1 to 48

The writing quality of the note sheet is classified into three rankings, which are represented as excellent (e), good (g), and fair (f), and is determined based on the writability, anchorage (a binding power of the pigment to the film), and ink absorbability.

Polypropylene was used as a plastic film in each of these Examples for preparing the note sheet The coating layers on these Examples were prepared from different combinations of binders and pigments with differing weight ratios of binder to pigment. The binders used in these Examples were polyvinyl alcohol (PVA), polyvinyl acrylate (PA), and styrene butadiene rubber (SBR). The pigments used in these Examples were titanium dioxide($TiO_2$), calcium carbonate ($CaCO_3$), and clay. The weight ratios of the binder to the pigment arranged in these Examples ranged from 1:10 to 1:1, which are expressed in terms of grams of binder per 100 g of pigment in Tables 1–3.

TABLE 1

| Example # | $TiO_2$ g | Clay g | $CaCO_3$ g | PVA g |
| --- | --- | --- | --- | --- |
| 1 | 100 | — | — | 100 |
| 2 | 100 | — | — | 75 |
| 3 | 100 | — | — | 50 |
| 4 | 100 | — | — | 25 |
| 5 | 100 | — | — | 20 |

TABLE 1-continued

| Example # | TiO₂ g | Clay g | CaCO₃ g | PVA g |
|---|---|---|---|---|
| 6 | 100 | — | — | 15 |
| 7 | — | 100 | — | 100 |
| 8 | — | 100 | — | 75 |
| 9 | — | 100 | — | 50 |
| 10 | — | 100 | — | |
| 11 | — | 100 | — | |
| 12 | — | 100 | — | 20 |
| 13 | — | 100 | — | 15 |
| 14 | — | 100 | — | 10 |
| 15 | — | 100 | — | 5 |
| 16 | — | — | 100 | 75 |
| 17 | — | — | 100 | 50 |
| 18 | — | — | 100 | 30 |
| 19 | — | — | 100 | 20 |

TABLE 2

| Example # | TiO₂ g | Clay g | CaCO₃ g | PA g |
|---|---|---|---|---|
| 20 | — | — | 100 | 100 |
| 21 | — | — | 100 | 75 |
| 22 | — | — | 100 | 50 |
| 23 | — | — | 100 | 25 |
| 24 | — | — | 100 | 5 |
| 25 | 100 | — | — | 100 |
| 26 | 100 | — | — | 75 |
| 27 | 100 | — | — | 50 |
| 28 | 100 | — | — | 25 |
| 29 | 100 | — | — | 5 |
| 30 | — | 100 | — | 100 |
| 31 | — | 100 | — | 75 |
| 32 | — | 100 | — | 50 |
| 33 | — | 100 | — | 25 |
| 34 | — | 100 | — | 5 |

TABLE 3

| Example # | TiO₂ g | Clay g | CaCO₃ g | SBR g |
|---|---|---|---|---|
| 35 | 100 | — | — | 100 |
| 36 | 100 | — | — | 75 |
| 37 | 100 | — | — | 50 |
| 38 | 100 | — | — | 25 |
| 39 | — | 100 | — | 100 |
| 40 | — | 100 | — | 75 |
| 41 | — | 100 | — | 50 |
| 42 | — | 100 | — | 25 |
| 43 | — | 100 | — | 5 |
| 44 | — | — | 100 | 100 |
| 45 | — | — | 100 | 75 |
| 46 | — | — | 100 | 50 |
| 47 | — | — | 100 | 25 |
| 48 | — | — | 100 | 5 |

Examples 1–19 are listed in Table 1, Examples 20–34 in Table 2, and Examples 35–48 in Table 3.

The results of these Examples are shown in Table 4. To summarize from the results shown in Table 4, Examples 1–2 which contain TiO₂, Examples 12–14, 33–34 and 42–43 which contain clay, and Examples 19, and 45–47 which contain CaCO₃ exhibit good and/or excellent writability, anchorage, and as well as ink absorbability.

TABLE 4

| Example # | Writability | Anchorage | Ink absorbability |
|---|---|---|---|
| 1 | e | g | e |
| 2 | e | g | e |
| 3 | e | f | g |
| 4 | g | f | g |
| 5 | g | g | g |
| 6 | f | f | e |
| 7 | f | f | e |
| 8 | f | f | e |
| 9 | e | f | f |
| 10 | f | f | e |
| 11 | g | f | e |
| 12 | g | g | g |
| 13 | g | g | g |
| 14 | g | e | g |
| 15 | g | e | f |
| 16 | e | f | g |
| 17 | e | f | f |
| 18 | e | f | F |
| 19 | e | g | g |
| 20 | f | e | f |
| 21 | f | g | f |
| 22 | e | g | f |
| 23 | g | g | f |
| 24 | g | g | f |
| 25 | f | e | f |
| 26 | f | e | f |
| 27 | f | g | e |
| 28 | g | g | g |
| 29 | peeling | — | — |
| 30 | f | g | f |
| 31 | f | e | f |
| 32 | f | e | f |
| 33 | g | e | g |
| 34 | e | e | g |
| 35 | g | e | f |
| 36 | e | e | f |
| 37 | e | e | f |
| 38 | g | f | f |
| 39 | g | e | f |
| 40 | g | e | f |
| 41 | g | e | f |
| 42 | e | e | g |
| 43 | g | g | g |
| 44 | g | e | f |
| 45 | e | e | g |
| 46 | g | e | g |
| 47 | g | g | g |
| 48 | g | f | g |

The following Examples illustrate variation of the opacity of the note sheet 1 with coating weight of the coating layer 112 for different combinations of pigments and binders.

EXAMPLES 49 to 100

Polypropylene was used as a plastic film in each of these Examples for preparing the note sheet. The coating layers on these Examples were prepared from different combinations of binders and pigments with differing weight ratios of binder to pigment and with differing weight of the coating (in terms of gram per square meter). The binders (in these Examples were polyvinyl alcohol, polyvinyl acrylate, and styrene butadiene rubber. The pigments used in these Examples were titanium dioxide, calcium carbonate, and clay. The opacities of these Examples were listed in Tables 5 to 7.

TABLE 5

| Example # | TiO₂ g | Clay g | CaCO₃ g | PVA g | Coating weight, g/m² | Opacity |
|---|---|---|---|---|---|---|
| 49 | — | 100 | — | 5 | 2.4 | 25.93 |
| 50 | — | 100 | — | 5 | 5.6 | 43.63 |
| 51 | — | 100 | — | 5 | 8.1 | 52.87 |
| 52 | — | 100 | — | 50 | 1.6 | 15.60 |
| 53 | — | 100 | — | 50 | 3.8 | 19.50 |
| 54 | — | 100 | — | 50 | 9.2 | 26.21 |
| 55 | — | 100 | — | 100 | 2.5 | 12.98 |
| 56 | — | 100 | — | 100 | 6.7 | 21.27 |
| 57 | — | 100 | — | 100 | 9.0 | 23.58 |
| 58 | — | — | 100 | 50 | 1.6 | 30.15 |
| 59 | — | — | 100 | 50 | 4.1 | 34.93 |
| 60 | — | — | 100 | 50 | 8.6 | 43.92 |
| 61 | 100 | — | — | 50 | 1.9 | 35.71 |
| 62 | 100 | — | — | 50 | 4.2 | 44.78 |
| 63 | 100 | — | — | 50 | 7.7 | 55.74 |

TABLE 6

| Example # | TiO₂ g | Clay g | CaCO₃ g | PVA g | Coating weight, g/m² | Opacity |
|---|---|---|---|---|---|---|
| 64 | — | 100 | — | 50 | 6.1 | 12.61 |
| 65 | — | 100 | — | 50 | 22.4 | 12.71 |
| 66 | — | 100 | — | 50 | 29.1 | 12.53 |
| 67 | — | — | 100 | 50 | 3.3 | 27.18 |
| 68 | — | — | 100 | 50 | 4.7 | 28.70 |
| 69 | — | — | 100 | 50 | 9.1 | 47.12 |
| 70 | 100 | — | — | 50 | 1.1 | 29.33 |
| 71 | 100 | — | — | 50 | 3.5 | 40.97 |
| 72 | 100 | — | — | 50 | 8.0 | 61.82 |

TABLE 7

| Example # | TiO₂ g | Clay g | CaCO₃ g | PVA g | Coating weight, g/m² | Opacity |
|---|---|---|---|---|---|---|
| 73 | — | 100 | — | 50 | 3.0 | 20.61 |
| 74 | — | 100 | — | 50 | 5.7 | 23.38 |
| 75 | — | 100 | — | 50 | 11.1 | 31.55 |
| 76 | — | — | 100 | 50 | 3.3 | 28.69 |
| 77 | — | — | 100 | 50 | 4.1 | 40.21 |
| 78 | — | — | 100 | 50 | 8.6 | 50.04 |
| 79 | 100 | — | — | 50 | 1.7 | 46.73 |
| 80 | 100 | — | — | 50 | 3.1 | 49.63 |
| 81 | 100 | — | — | 50 | 9.1 | 65.83 |
| 82 | 100 | — | — | 50 | 10.6 | 71.49 |

Tests were conducted to investigate the effect of the opacity of the note sheet on quality of a copy sheet reproduced by subjecting an assembly of a printed paper sheet and a note sheet that is prepared from each of these Examples and that is attached to the printed paper sheet, via a copier machine and followed by observing the quality of images or characters printed on the copy sheet that were reproduced from corresponding images or characters on a region of the printed paper sheet which was covered by the note sheet during the reproduction process.

The quality of the copy sheet is determined based on clearness of the reproduced images or characters on the copy sheet, and is classified into four rankings, which are represented as excellent (e), good (g), fair (f), and poor (p). The results of these tests are shown in Table 8.

TABLE 8

| Example # | Clearness | Example # | Clearness | Example # | Clearness |
|---|---|---|---|---|---|
| 49 | g | 61 | g | 73 | g |
| 50 | f | 62 | f | 74 | g |
| 51 | f | 63 | p | 75 | g |
| 52 | e | 64 | e | 76 | g |
| 53 | e | 65 | e | 77 | f |
| 54 | g | 66 | e | 78 | p |
| 55 | e | 67 | g | 79 | f |
| 56 | g | 63 | g | 80 | f |
| 57 | g | 69 | f | 81 | p |
| 58 | g | 70 | g | 82 | p |
| 59 | g | 71 | f | | |
| 60 | f | 72 | p | | |

To summarize from the results shown in Table 8, the note sheet employed in the note pad of this invention is preferably have an opacity of less than 55%, more preferably less than 40%, and most preferably less than 30%.

When the note sheet employed in the above tests is replaced with a Post-it™ note sheet (available from 3M corporation, a U.S. based company), which has a yellow color and which has an opacity of about 90%, the quality of the copy sheet based on the aforesaid ranking is very poor.

With the invention thus explained, it is apparent that various modifications and variations can be made without departing from the spirit of the present invention It is therefore intended that the invention be limited only as recited in the appended claims.

We claim:

1. A note pad comprising a plurality of self-stick transparent note sheets adhesively connected to one above the other, each of said note sheets including a transparent plastic film with two opposite faces that are respectively coated with a transparent coating layer and a pressure-sensitive adhesive layer, said coating layer being prepared from a mixture of binder and at least one pigment, the weight ratio of said binder to said pigment ranging from 1:1 to 1:10, each of said note sheets having an opacity of less than 55%.

2. The note pad of claim 1, wherein each of said note sheets having an opacity of less than 40%.

3. The note pad of claim 1, wherein each of said note sheets having an opacity of less than 30%.

4. The note pad of claim 1, wherein said binder is selected from the group consisting of polyvinyl alcohol, polyacrylate, polyvinyl acrylate, and styrene butadiene rubber, said pigment being selected from the group consisting of titanium dioxide, calcium carbonate, clay, and mixtures thereof.

5. The note pad of claim 1, wherein said plastic film of each of said note sheets is made from a material selected from the group consisting of polypropylene, polyethylene, polyvinyl chloride, and polyethylene terephthalate.

6. The note pad of claim 1, further comprising a release paper that covers said coating layer on said plastic film of each of said note sheets.

7. A note pad comprising a plurality of self-stick transparent sheets, each transparent sheet having a transparent coating coated on an upper surface and a pressure-sensitive adhesive layer coated on a rear surface, the pressure sensitive layer of each transparent sheet adhering directly to an upper surface of the transparent coating on an adjacent transparent sheet to hold the plurality of transparent sheets together and form the pad.

8. A note pad of claim 7, wherein said coating layer comprises a mixture of a binder and at least one pigment, the weight ratio of said binder to said pigment ranging from 1:1 to 1:10, and wherein each of said note sheets has an opacity of less than 55%.

9. A note pad of claim 7, wherein the pressure-sensitive adhesive layer is coated only along a predetermined narrow edge portion of each transparent sheet.

* * * * *